US012341916B2

(12) United States Patent
Shulman

(10) Patent No.: US 12,341,916 B2
(45) Date of Patent: Jun. 24, 2025

(54) NON-FUNGIBLE TOKEN OWNERSHIP REGISTRATION AND VERIFICATION SYSTEM

(71) Applicant: CounterTEN, Inc., San Diego, CA (US)

(72) Inventor: Steven P. Shulman, San Diego, CA (US)

(73) Assignee: CounterTEN, Inc.

(*) Notice: Subject to any disclaimer, the term of this patent is extended or adjusted under 35 U.S.C. 154(b) by 327 days.

(21) Appl. No.: 18/118,722

(22) Filed: Mar. 7, 2023

(65) Prior Publication Data

US 2023/0289410 A1  Sep. 14, 2023

Related U.S. Application Data

(60) Provisional application No. 63/318,818, filed on Mar. 11, 2022.

(51) Int. Cl.
*H04L 9/00* (2022.01)
*G06F 21/10* (2013.01)

(52) U.S. Cl.
CPC .............. *H04L 9/50* (2022.05); *G06F 21/10* (2013.01)

(58) Field of Classification Search
CPC .................................. G06F 21/10; H04L 9/50
USPC ............................................................ 726/26
See application file for complete search history.

(56) References Cited

U.S. PATENT DOCUMENTS

| | | | | |
|---|---|---|---|---|
| 2021/0390531 A1* | 12/2021 | Voorhees | ............. | G06Q 20/367 |
| 2022/0269754 A1* | 8/2022 | Cardo Sanchez | ..... | G06F 21/105 |
| 2022/0366061 A1* | 11/2022 | Spivack | ................ | H04L 9/3271 |
| 2022/0414621 A1* | 12/2022 | Parlotto | ................. | G06F 21/64 |
| 2023/0104103 A1* | 4/2023 | Eby | ..................... | G06Q 20/3678 |
| | | | | 705/69 |
| 2023/0130182 A1* | 4/2023 | Mir | ....................... | H04L 9/3247 |
| | | | | 713/189 |
| 2023/0135947 A1* | 5/2023 | Barhudarian | ............. | H04L 9/30 |
| | | | | 726/26 |

* cited by examiner

*Primary Examiner* — Dant B Shaifer Harriman
(74) *Attorney, Agent, or Firm* — Daylight Law, P.C.

(57) ABSTRACT

Methods and systems related to non-fungible token (NFT) verification are disclosed herein. The systems and methods allow verifiers to conduct an ownership verification process in a frictionless and efficient manner without the need to understand and implement complex cryptographic algorithms and blockchain technologies. A disclosed system for verifying an NFT is a blockchain shell which accepts an NFT owner identifier from a verifier, verifies an NFT, and returns ownership verification data to a verifier device. Numerous approaches for registering NFT ownership with the blockchain shell, generating, transferring, and accepting the NFT owner identifier, and verifying NFT ownership using the NFT owner identifier are disclosed herein.

18 Claims, 12 Drawing Sheets

Deliver Link
1201

NON-FUNGIBLE TOKEN OWNERSHIP REGISTRATION AND VERIFICATION SYSTEM

CROSS-REFERENCE TO RELATED APPLICATIONS

This application claims the benefit of U.S. Provisional Patent Application No. 63/318,818 filed Mar. 11, 2022, which is incorporated by reference herein in its entirety for all purposes.

BACKGROUND

Non-fungible tokens (NFTs) are ledger entries stored on a blockchain that indicate both an ownership right of a distinct asset and an owner of that ownership right. Common NFTs include those minted using the ERC-721 and ERC-1155 standards on the Ethereum blockchain and the Metaplex Protocol on the Solana blockchain. In these examples, the ledger entry includes an NFT identifier associated with the distinct asset, paired with a public identifier associated with the owner. The public identifier associated with the owner can be referred to as the public wallet identifier for the owner. The ledger entry can be found in the blockchain using an NFT address. In other words, the NFT address can be used to search the blockchain to find the NFT identifier and the public wallet identifier.

Ownership of an NFT can be verified using a verification process agreed upon by the owner of the NFT and the verifier. As used throughout this disclosure "ownership verification" means verifying that an entity is the owner associated with the public identifier in a ledger entry on a blockchain. Standard ownership verification processes do not require the creation of an entry on the blockchain, but they do involve the use of cryptographic technology that is in accordance with the encryption standards used by the blockchain. The verification process begins by the owner of the NFT (i.e., the owner) and the person requesting verification of ownership (i.e., the verifier) agreeing on an arbitrary message (e.g., "I am the owner"). The next step involves the owner encrypting the message using the owner's private key. The next step involves the verifier decrypting the message using the public key. In many cases the public key is the public wallet identifier itself. Owing to the fundamental cryptographic principles which underly nearly all blockchain technology, if the decryption process is successful, the verifier will know that the owner is in possession of the private key and is indeed the owner of the NFT but will not need to access the private key to do so.

While the ownership verification process described in the prior paragraph will be considered rudimentary to those of ordinary skill in the art of blockchain technology, it is not simple for people that are not fortunate enough to have such backgrounds. Furthermore, even armed with an understanding of how such a process is conducted, people will experience various difficulties when attempting to implement such a process. For example, executing the algorithms involved with encrypting and decrypting the arbitrary message can be difficult, and the logistical and administrative burdens associated with accessing the blockchain at a specific NFT address, obtaining the public key, and agreeing upon the message used for verification are likewise nontrivial. As such, systems and methods that allow verifiers to conduct an ownership verification process in a frictionless and efficient manner, without the need to understand and implement complex cryptographic algorithms, or the requirement for specialized hardware or software applications and/or other blockchain technologies, can provide a significant benefit to the widespread utilization of NFTs.

SUMMARY

This disclosure relates generally to token verification and more specifically to non-fungible token (NFT) verification. As used in this disclosure, verifying an NFT includes both verifying the validity of an NFT and verifying NFT ownership. Using specific embodiments of the systems and methods disclosed herein, individuals and companies can verify an NFT without the need to execute complex cryptographic algorithms. In specific embodiments, NFT ownership can be registered and verified using a blockchain shell system that provides an interface between the blockchain and users that are interested in verifying NFTs without those users needing to interact directly with the blockchain or administrate the execution of cryptographic algorithms. As used herein, the term blockchain shell system refers to any system that allows for the isolation of a verifier from the need to interface with a blockchain while still providing the ability to verify ownership rights recorded on that blockchain. Accordingly, in specific embodiments of the invention, verifying ownership can be as simple as scanning a QR code or reading a code using Near-Field Communication (NFC) and passing the obtained information to the blockchain shell system. Furthermore, in specific embodiments disclosed herein, the ownership of an NFC can be verified without the verifier, blockchain shell system, or any other party needing to execute a cryptographic algorithm, thereby reducing the computational resources consumed in the verification of NFT ownership.

In specific embodiments of the invention, NFT verification can be conducted while an owner and a verifier are in the same locale. For example, the NFT could be associated with a distinct asset in the form of the right to occupy a space in a live event such as a concert, conference, or professional sports event. The verification process can include the blockchain shell registering the NFT and generating or obtaining an NFT owner identifier for the NFT, the owner presenting a physical representation of the NFT owner identifier at the locale, and the verifier using the physical representation and a connection to the blockchain shell system to verify the NFT. The physical representation could be provided by the owner using a first device (e.g., an owner device) and accepted by the verifier using a second device (e.g., a verifier device). The physical representation could be an electromagnetic encoding such as a short range ultraviolet or radio signal such as an NFC signal, an auditory encoding such as a sonic pulse or frequency modulated signal, a visual encoding such as a QR code or 2D bar code, and various other potential physical representations that can be presented by an owner to a verifier at a locale. The physical representation can be stored on and presented by an application on a smartphone, tablet, or computer of a user. For example, the physical representation could be a QR code or a radio frequency identification (RFID) encoding which is part of an electronic identification card stored in a wallet application on a smartphone. In specific embodiments of the invention, the wallet application could allow a user to manage, store, and present many different NFTs from within the wallet application as needed.

In specific embodiments of the invention, a method for verifying an NFT is provided. The method comprises receiving an NFT owner identifier from a verifier device, where the NFT owner identifier was transferred from an owner device to the verifier device at a locale, using a physical representation of the NFT owner identifier. The method also comprises verifying ownership of an NFT using the NFT owner identifier. The method also comprises returning ownership verification data of the NFT to the verifier device.

In specific embodiments of the invention, one or more non-transitory computer-readable media storing instructions that, when executed by one or more processors, cause a system to execute a method for verifying an NFT are provided. The method comprises receiving an NFT owner identifier from a verifier device. The NFT owner identifier was transferred from an owner device to the verifier device, at a locale, using a physical representation of the NFT owner identifier. The method also comprises verifying ownership of an NFT using the NFT owner identifier. The method also comprises returning ownership verification data of the NFT to the verifier device.

In specific embodiments of the invention, a system for verifying an NFT is provided. The system comprises a server configured to receive an NFT owner identifier from a verifier device, wherein the NFT owner identifier was transferred from an owner device to the verifier device, at a locale, using a physical representation of the NFT owner identifier. The server is further configured to verify ownership of an NFT using the NFT owner identifier. The server is further configured to return ownership verification data of the NFT to the verifier device.

BRIEF DESCRIPTION OF THE DRAWINGS

The accompanying drawings illustrate various embodiments of systems, methods, and embodiments of various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different systems and methods associated with token verification in accordance with the summary above will be described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Methods for verifying a nonfungible token (NFT) in accordance with the summary above comprise several steps. The steps can be conducted by a system including a blockchain shell system providing verification services. For example, the steps of receiving an NFT owner identifier, verifying ownership of an NFT, and returning ownership verification data in accordance with the summary above can all be conducted by a blockchain shell system. The blockchain shell system can be a web accessible service or can be accessed through APIs accessed by applications stored on various devices. The blockchain shell system can be implemented by one or more servers and one or more databases. The blockchain shell system can have access to one or more blockchains for which it is providing verification services.

Figure 1:
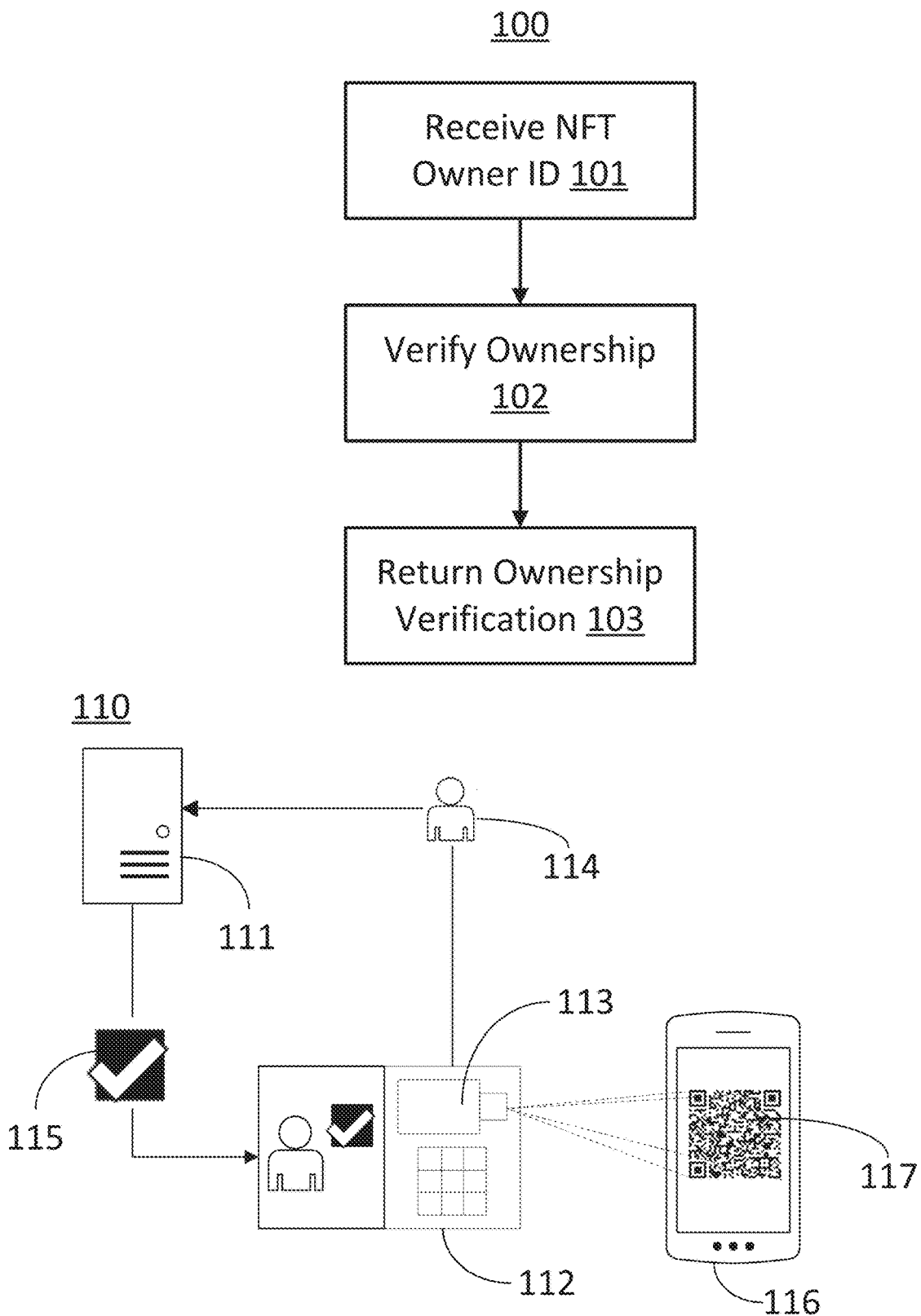
FIG. 1 includes a flow chart for a set of methods and a block diagram of a system for verifying an NFT in accordance with specific embodiments of the invention disclosed herein.

FIG. 1 provides a flow chart 100 for a set of methods of verifying an NFT and a block diagram 110 of a system for verifying an NFT in accordance with specific embodiments of the inventions disclosed herein. The steps of flow chart 100 include a step 101 of receiving an NFT owner identifier from a verifier device. The NFT owner identifier can have been transferred from an owner device to the verifier device, at a locale, using a physical representation of the NFT owner identifier. The steps of flow chart 100 also include a step 102 of verifying ownership of the NFT using the NFT owner identifier. The steps of flow chart 100 also include a step 103 of returning ownership verification data of the NFT to the verifier device.

The steps of flow chart 100 can be conducted by a blockchain shell system. The blockchain shell system can be at least partially instantiated by one or more servers, as represented by server 111 in block diagram 110. The steps of the flow chart 100 can be conducted by one or more servers, as represented by server 111 in block diagram 110, configured to execute those steps. The servers can be configured to execute those steps by storing executable instructions to do so, by having a network connection to a verifier device and optionally to an owner device, and by having access to an internal database and/or a blockchain. One or more non-transitory computer-readable media, such as the main memories of the aforementioned one or more servers as represented by server 111, can store instructions that, when executed by one or more processors, such as the processors of the aforementioned one or more servers as represented by server 111, cause a system to execute methods in accordance with the steps in flow chart 100.

The steps of the methods for verifying NFTs can involve a verifier device operated by a user who is attempting to verify an NFT (i.e., a verifier). The verifier device can be a smartphone, personal computer, laptop, point-of-sale terminal, dedicated scanning device, access control panel or dedicated scanner, wearable, or any other passive or active electronic device. For example, the verifier device could be a dedicated scanning device 112 as in block diagram 110. Dedicated scanning device 112 includes a display, a user interface in the form of a keypad, and an optical scanning device in the form of a visible light camera 113. In specific embodiments of the invention, the verifier device can do one or more of: obtain an NFT owner identifier, transmit the NFT owner identifier to the blockchain shell system, and receive returned ownership verification data from the blockchain shell system. Each of those individual steps can be conducted by the same verifier device. Alternatively, one or more of those individual steps can be conducted by separate devices associated with the verifier. In the example of FIG. 1, dedicated scanning device 112 obtains the NFT owner identifier from an owner device as described below, transmits an NFT owner identifier 114 to a blockchain shell system implemented at least in part by server 111, and receives returned ownership verification data 115 back from the block chain shell system implemented at last in part by server 111.

The steps of the methods for verifying NFTs can also involve an owner device operated by a user who owns the NFT and is attempting to allow a verifier to verify their NFT ownership (i.e., an owner). The owner device can be any of the types of devices mentioned above with respect to the verifier device. In the example of block diagram 110, the owner device is a smartphone 116. In specific implementations, the owner device can do one or more of: storing the NFT owner identifier, presenting the NFT owner identifier to a verifier device, and transferring the NFT owner identifier from the owner device to the verifier device. The manner in which the NFT owner identifier is presented and transferred will depend on the characteristics of the owner device, the verifier device, and the physical representation of the NFT owner identifier. For example, if the NFT owner identifier were in the form of an audio signal, the NFT owner identifier would be presented by being played by a speaker on the owner device, and would be transferred via the sound waves as generated by the owner device and captured by a microphone on the verifier device. As another example, the physical representation of the NFT owner identifier could be a visual encoding (e.g., QR code 117) presented on a display of an owner device (e.g., smartphone 116). In this example, the NFT owner identifier (e.g., NFT owner identifier 114) is transferred from the owner device (e.g., smartphone 116) to the verifier device (e.g., dedicated scanning device 112) using an optical sensor (e.g., visible light camera 113) on the verifier device. In alternative approaches, the owner device is not a required element of the system as the NFT owner identifier could take on a physical representation that does not depend on an electronic device such as a passive visual encoding (e.g., on an article of clothing or piece of paper), a biometric, a code entered on a verifier device by an owner, or a password spoken into a microphone of a verifier device by an owner.

Depending upon the embodiment utilized, the ownership verification data can take on various forms. For example, if what-you-have verification or what-you-know verification is considered enough, the mere fact that the owner identifier was presented by an owner and is stored in a database accessible to the blockchain shell system would be enough in order for the ownership verification data to be a binary output (e.g., a symbol such as a checkmark indicating that ownership was verified or an "X" indicating that ownership was not verified). In alternative approaches, the owner identifier and an NFT identifier are both sent from the verifier device, and the fact that the owner identifier was presented and stored in a database accessible to the blockchain shell system in association with the NFT identifier is enough in order for the ownership verification data to be a similar binary output. If what-you-have and who-you-are verification is required, the ownership verification data could alternatively or in combination include personal identifying information such as a full name of a user or a phone number of the user. The ownership verification data could be stored by the blockchain shell system in association with the owner identifier and an optional NFT identifier. The personal identifying information could then be provided to the verifier device, in response to a search for the owner identifier, to allow the verifier to confirm identification using the ownership verification data (e.g., by requesting a driver's license for the owner or by sending an SMS confirmation to a phone number of the owner).

Depending upon the embodiment utilized, the NFT owner identifier can take on various forms. For example, the NFT owner identifier can be generated by the blockchain shell system and stored internally for later verification. The NFT owner identifier could be a random string of characters generated by a random character generator administrated by the blockchain shell system, a random collection of frequencies and amplitudes, or any kind of digital encoding generated by the blockchain shell system to be used as the NFT owner identifier. Alternatively, the NFT owner identifier can be external information obtained by the blockchain shell system. The obtained NFT owner identifier can then be stored by the blockchain shell system for later verification. For example, the NFT owner identifier could be a full legal name of the owner of the NFT or an NFT owner identifier directly associated with the blockchain itself such as a public wallet identifier for the NFT.

As applied in specific embodiments described below, the NFT owner identifier issued by the blockchain shell system can be a private NFT owner identifier or a public NFT owner identifier. The private NFT owner identifier could be issued to the owner and stored on an owner device in an encrypted format such that it can be exchanged with the blockchain shell system through a verifier device or any public network while remaining private. In these embodiments, the NFT owner identifier could be transferred from an owner device through a verifier device in encrypted format such that the verifier device could be assured by the blockchain shell system that they had passed an NFT owner identifier provided by a specific owner while not obtaining access to the underlying NFT owner identifier. In alternative embodiments, the NFT owner identifier issued by the blockchain shell system can be a public NFT owner identifier such as a full legal name of the owner or a public wallet identifier of the NFT as stored on the blockchain.

A blockchain shell system in accordance with specific embodiments of the invention disclosed herein can verify ownership of an NFT in various ways. The system can verify ownership on demand in response to a request from a verifier and ex ante in response to an action taken by or on behalf of the owner. In either case, ownership verification can be conducted as part of a registration of the NFT with the system. Registration of the NFT with the blockchain shell system provides certain benefits in that later verification requests can be conducted entirely within the blockchain shell system and may only require a double check review of the public information on the associated blockchain to confirm ownership. In embodiments in which the blockchain shell system controls ownership of the NFT (e.g., because it holds the NFT custodially for the owner or because it owns the NFT), the double check back to the blockchain may be skipped.

Ex ante ownership verification and registration of an NFT in accordance with specific embodiments of the invention disclosed herein can be conducted in various ways. Ex ante ownership verification of an NFT can be conducted by the blockchain shell system minting the NFT, by the blockchain shell system administrating a transfer of ownership of the NFT from a custodial wallet to the owner's personal wallet, by the blockchain shell system administering a transfer of ownership on a secondary market administrated by the blockchain shell system, or by the blockchain shell system onboarding an NFT at the request of the owner. In the case of minting an NFT, transferring an NFT to an owner, or administrating a secondary market transfer of the NFT, the blockchain shell system provides ownership verification services as it records who the owner of the newly minted NFT is or who the current owner of the NFT is on the secondary market. In the case of minting the NFT or administrating the transfer of the NFT, registering the NFT with the blockchain shell system can include creating an entry on the blockchain with an NFT owner identifier that directly identifies the owner, or by updating the internal records of the blockchain shell system while a custodial wallet identifier used by the blockchain shell system is recorded on the blockchain. In the case of onboarding an NFT, the blockchain shell system can administrate the kinds of ownership verification procedures typically conducted to verify NFT ownership, such as those described in the background above. For example, the blockchain shell system could request that the owner encrypt a message with a private key associated with the NFT. After ownership verification is proved to the blockchain shell system in this manner, the NFT can be registered with the blockchain shell system such that later verifications of ownership can be conducted internally to the blockchain shell system.

Registration of an NFT in accordance with specific embodiments of the invention disclosed herein can additionally include the onboarding of personal information to be shared with a network of verifiers in exchange for incentives provided to the owners of the NFT. The personal information can include at least one of a full legal name of the owner of the NFT, a street address of the owner of the NFT, an email address of the owner of the NFT, and a mobile phone number of the owner of the NFT. Alternatively, or in combination, the personal information can include commercial interests of the NFT owner, spending patterns of the NFT owner, and other consumer profile information. The personal information can be entered manually by the user or pulled from information sources available to the blockchain shell system upon authorization from the user. For example, the email history or payment service history of a user could be scanned to determine interests and spending patterns of the owner. The information could be stored in a database administrated by the blockchain shell system. The registration could include providing the user with the ability to share the information in the first place and the ability to configure how specific types of information were shared with verifiers. For example, the owner could set the system to always share all their personal information with all verifiers, partially share some personal information with specific verifiers, not share personal information with any verifiers, and any combination thereof. The owner could be provided with a personal information disclosure incentive in exchange for allowing the sharing of this information as will be explained in more detail below.

Figure 2:
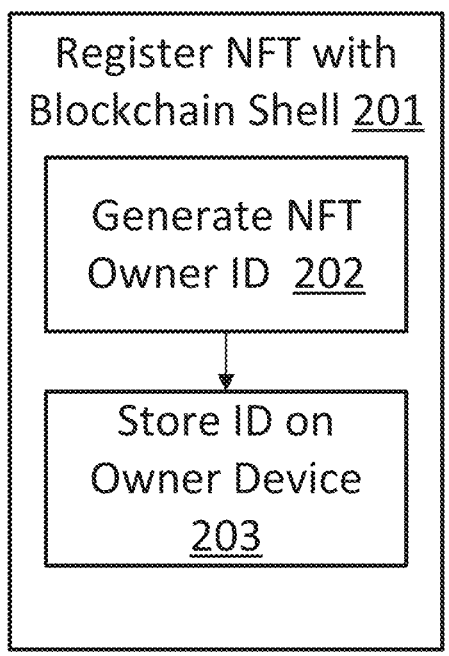
FIG. 2 includes a flow chart for a set of methods and a block diagram of a system for registering an NFT in accordance with specific embodiments of the invention disclosed herein.
Figure 2:
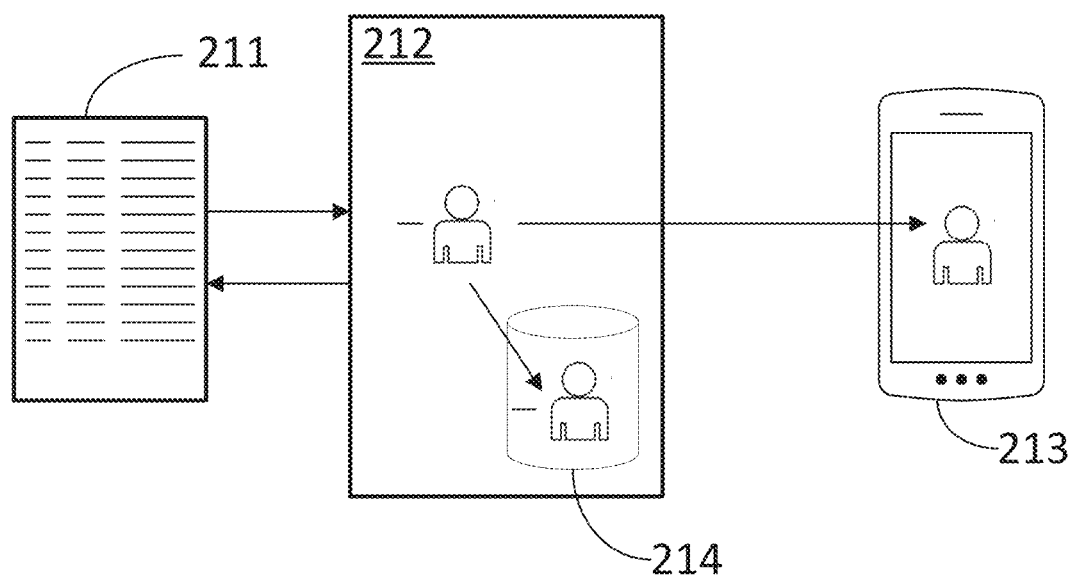

FIG. 2 provides a flow chart 200 for a set of methods of registering an NFT and a block diagram 210 of a system for registering an NFT in accordance with specific embodiments of the inventions disclosed herein. The steps of flow chart 200 include a step 201 of registering the NFT with a blockchain shell system. The registering step includes a step 202 of generating an NFT owner identifier. The registering step further includes a step 203 of storing an NFT owner identifier on an owner device. The block diagram 210 includes a blockchain 211, a blockchain shell system 212, and an owner device 213.

Registering the NFT with the blockchain shell system can be accompanied by generating an NFT owner identifier such as in step 202. In specific embodiments, the step can be conducted such that the NFT owner identifier internally identifies the owner of the owner device in the blockchain shell system and can be used within the blockchain shell system. The NFT owner identifier can be a string of characters or other data that identifies an owner. The NFT owner identifier can be randomly assigned such as by being a random and unique data set within the system or it can be based on data regarding the owner such as a hash of personal information regarding the user or an identifier of the owner device itself. In specific embodiments, the NFT owner identifier can be generated for storage locally on the blockchain shell system and on the owner device. The NFT owner identifier can be stored on the blockchain shell system in association with an NFT identifier such that ownership of a particular NFT is recorded by the blockchain shell system.

In specific embodiments of the invention, an NFT owner identifier can be stored on an owner's device after it has been obtained or generated by the blockchain shell system as in step 203 of flow chart 200, and the NFT owner identifier can internally identify an owner of the owner device in the blockchain shell system. As shown in block diagram 210, blockchain shell system 212 can access and/or write to blockchain 211 to register an NFT with the blockchain shell system 212 and can then generate an owner identifier and transfer the owner identifier to an owner device 213. The owner's device can be equipped with the capability to uniquely present the NFT owner identifier and may present the identifier in an encrypted encoding. Registering an NFT with the blockchain shell system can also include the blockchain shell system storing an NFT owner identifier in a database (e.g., database 214 of the blockchain shell system 212) in association with an identifier for the NFT. Storing the owner identifier in a database in association with the identifier for the NFT can comprise storing the two elements of data in a relational database as two entries that are accessible from a single database key.

Registering an NFT with the blockchain shell system may additionally or in the alternative include storing ownership verification data in association with the NFT or with the NFT owner identifier in the blockchain shell system. The ownership verification data could be a full legal name of the owner, metadata stored with the NFT on the blockchain, the NFT address, and any other information that can be used to verify the owner's identity or to assist in the verification of ownership. The ownership verification data could be stored in association with the owner identifier and could also be stored in association with an NFT identifier for the NFT.

Figure 3:
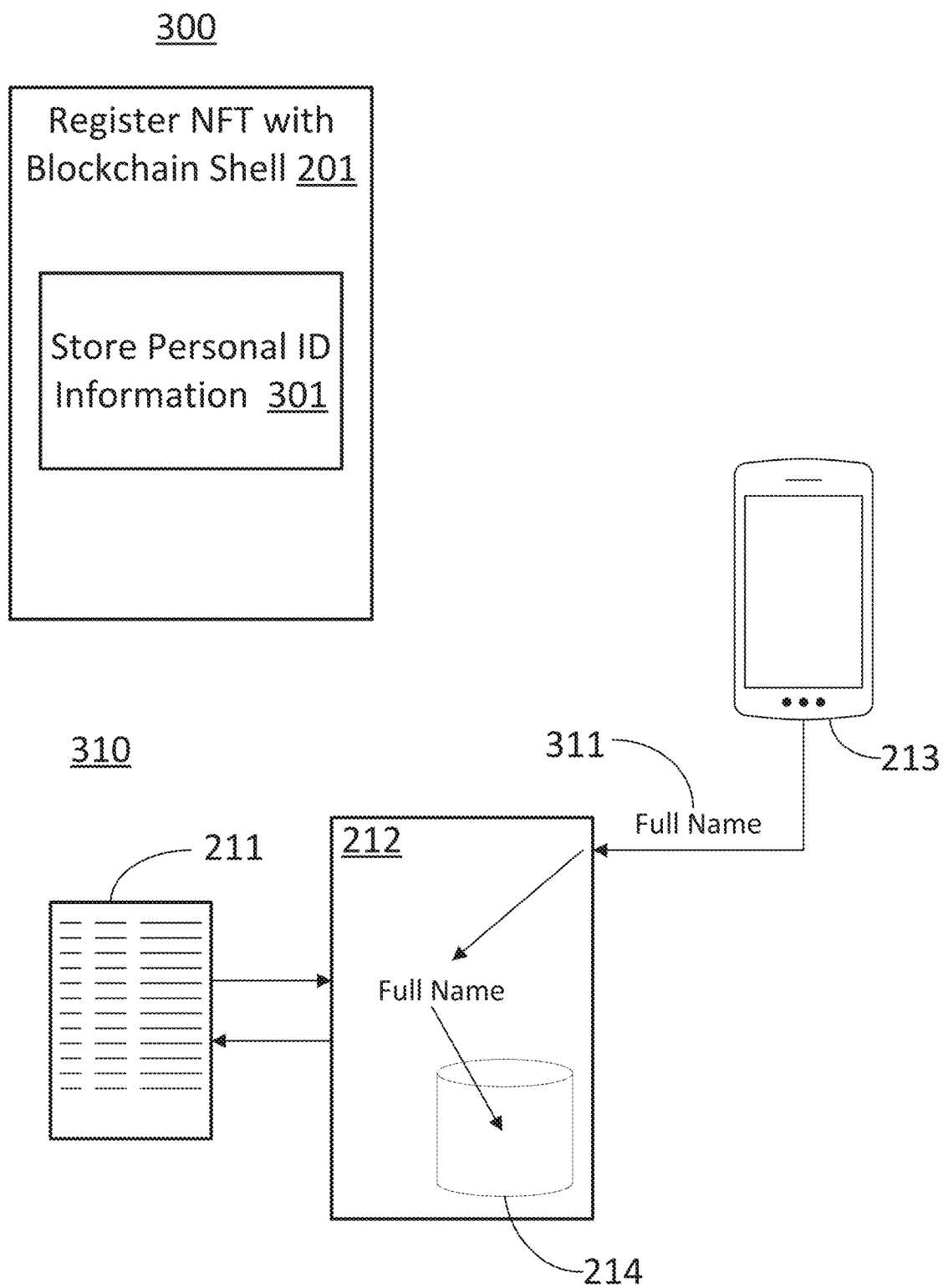
FIG. 3 includes a flow chart for a set of methods and a block diagram of a system for registering an NFT and storing personal information for an NFT owner in accordance with specific embodiments of the invention disclosed herein.

FIG. 3 provides a flow chart 300 for a set of methods of registering an NFT and a block diagram 310 of a system for registering an NFT in accordance with specific embodiments of the inventions disclosed herein. The steps of flow chart 300 include a step 301 of storing ownership verification data or personal identification information for an owner of an NFT. The ownership verification data can be a full legal name for the owner of an NFT. The data can be stored in a database of the blockchain shell system (e.g., database 214). As illustrated in block diagram 310, this step can include storing a full legal name 311 of an owner of an NFT in a database 214. The full legal name can be received from an owner device (e.g., owner device 213) during registration of the NFT. The personal identification information or ownership verification data can be solicited from the owner during the registration process. The personal identification information can be solicited in exchange for an incentive. The personal identification information or ownership verification data can be sent using the same device used by the owner to verify ownership of the NFT or from a different device.

Figure 4:
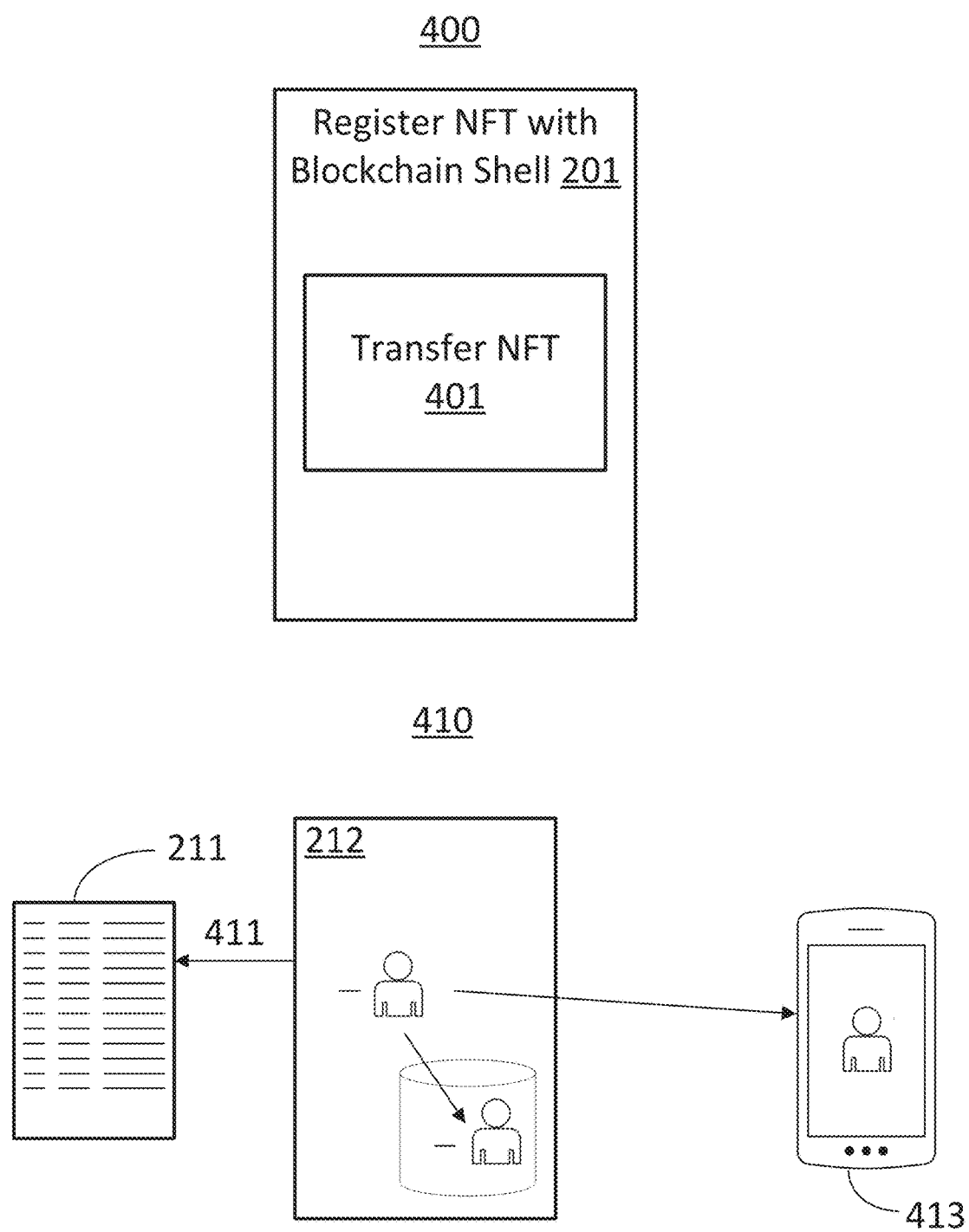
FIG. 4 includes a flow chart for a set of methods and a block diagram of a system for registering an NFT while transferring an NFT to an owner in accordance with specific embodiments of the invention disclosed herein.

FIG. 4 provides a flow chart 400 for a set of methods of registering an NFT and a block diagram 410 of a system for registering an NFT in accordance with specific embodiments of the inventions disclosed herein. The steps of flow chart 400 include a step 201 of registering the NFT with a blockchain shell system. The registering step includes a step 401 of transferring the NFT to the owner via an entry on a blockchain. The block diagram 410 includes a blockchain transfer request 411 being sent by blockchain shell system 212 to record the transfer. This request represents a request sent by the blockchain shell system to either mint a new NFT on the chain in the name of the owner or to transfer an existing NFT from one owner to the owner. Once the blockchain processes the transfer, the owner of the NFT will be the intended owner. The blockchain shell system can then optionally generate an NFT owner identifier for the owner and store it in a database in association with an identifier of the NFT. Alternatively, the NFT owner identifier can just be the public wallet ID of the owner as recorded on the block chain in response to blockchain transfer request 411. The blockchain shell system can then store the owner identifier in association with an identification of the NFT in a database and transmit the owner identifier to the owner device 413. The blockchain shell system can require any form of owner identification or monetary compensation prior to registering the NFT to the user in this manner.

Figure 5:
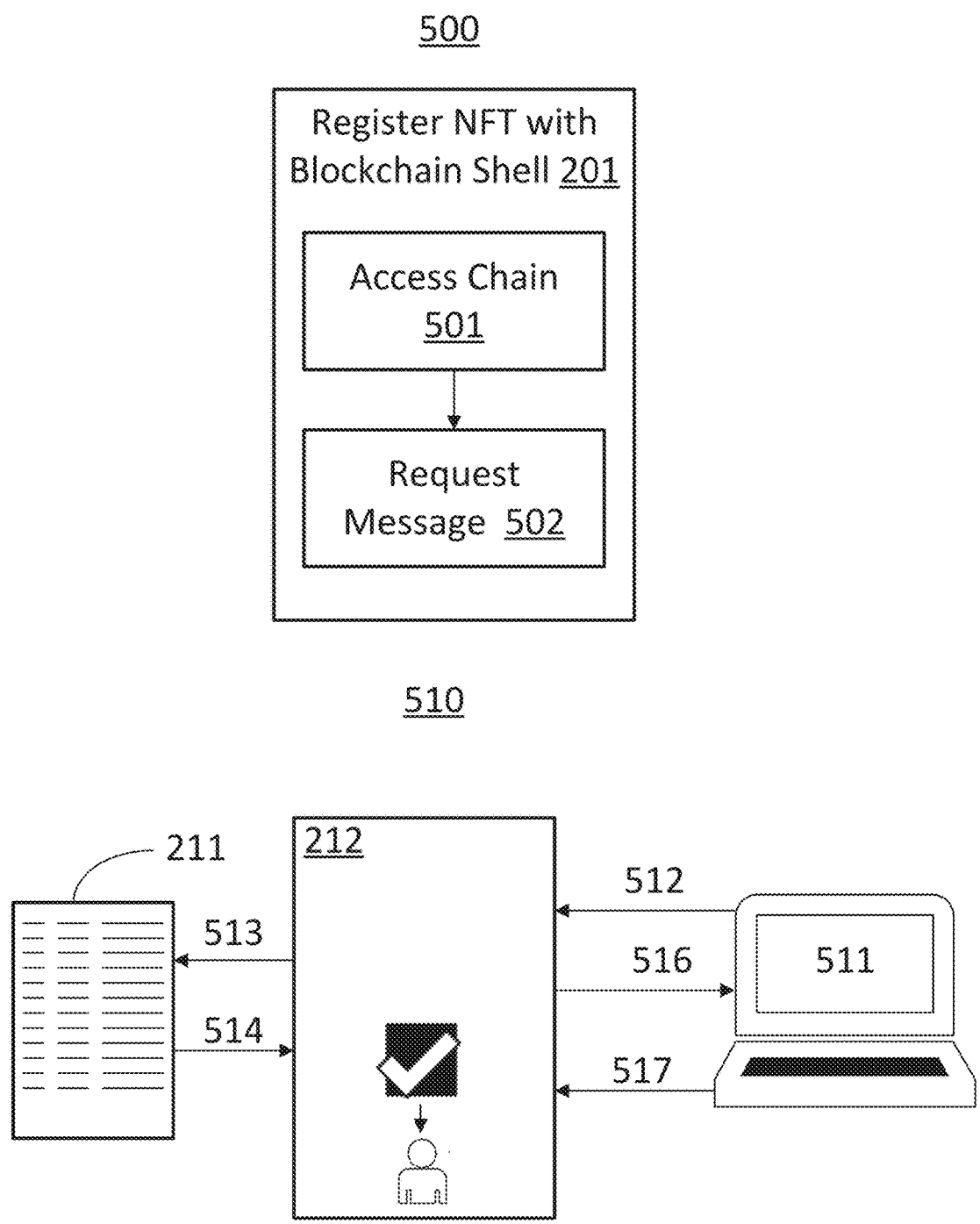
FIG. 5 includes a flow chart for a set of methods and a block diagram of a system for registering an NFT by verifying ownership using the blockchain associated with the NFT in accordance with specific embodiments of the invention disclosed herein.

FIG. 5 provides a flow chart 500 for a set of methods of registering an NFT and a block diagram 510 of a system for registering an NFT in accordance with specific embodiments of the inventions disclosed herein. The steps of flow chart 500 include a step 501 of accessing the blockchain to find a public key associated with an NFT to be registered and a step 502 of requesting a message encrypted with a private key associated with the NFT. As shown in block diagram 510, the registration process can commence with an owner device 511 transmitting a registration request 512 to blockchain shell system 212. Blockchain shell system 212 can then parse the registration request 512 to find what NFT is implicated by the registration request 512. Blockchain shell system 212 can then conduct step 501 and access blockchain 211 via a search query 513 to find a public key 514 associated with the NFT. Blockchain shell system 212 can then conduct step 502 to send an encryption request 516 with a message to owner device 511 requesting that owner device 511 encrypt the message with the private key associated with ownership of the NFT. The owner device 511 can then return an encrypted message 517. The blockchain shell system 212 can then decrypt the message using the public key and, assuming the private key really was available to owner device 511, the ownership of the NFT will have been verified by the blockchain shell system 212. The blockchain shell system 212 can then generate or obtain an ownership identifier for the owner and store it in association with an NFT identifier for the NFT.

Using the approach outlined with reference to FIG. 5, an owner can onboard their NFTs to the blockchain shell system for verification in accordance with embodiments disclosed herein. In alternative embodiments, owner device 511 can instead be an administrator operating a custodial wallet or set of wallets for users that will use NFTs minted or held by the administrator. In these embodiments, the blockchain shell could generate and transmit owner identifiers to the administrator to distribute to its users after the NFTs are registered.

On demand NFT ownership verification can be conducted in various ways. In specific embodiments of the invention, on demand ownership verification can be conducted entirely within the blockchain shell system. In these embodiments, if the NFT were previously registered with the blockchain shell system, verification could be conducted by accessing the internal databases of the blockchain shell system using the NFT owner identifier to see if the NFT was previously registered and looking up who the owner is. Alternatively, if the NFT was not previously registered, on demand NFT ownership verification could include registering the NFT with the system. For example, receipt of an NFT owner identifier in the form of a public wallet identifier could trigger the blockchain shell system to run a cryptographic owner verification process with the owner. If the owner's contact information were stored by the blockchain shell system in association with the public wallet identifier, the owner could be contacted in this manner. If no such information were stored, the blockchain shell system could ask the verifier to obtain contact information from the owner to continue the registration flow.

NFT ownership verification conducted internally to the blockchain shell system could include a double check reference back to the blockchain to assure that the internal records of the blockchain shell system were current and the NFT had not been transferred to a new owner externally to the blockchain shell system. The reference could involve checking to see if a public wallet identifier stored in association with the NFT in the blockchain shell system still matched the public wallet identifier stored on the blockchain. The NFT address of the NFT could be stored in association with the NFT in the blockchain shell system to facilitate this lookup. The double check could be conducted each time the blockchain shell system confirmed ownership. The double check could also be conducted on a periodic basis with a higher frequency allotted to NFTs that are not traded on a secondary market administrated by the blockchain shell system or custodially held by the blockchain shell system.

In specific embodiments of the invention, in demand owner verification for an NFT could be conducted similarly to the approach for registering an NFT as disclosed in FIG. 5. In these embodiments, the NFT may not have been preregistered with the blockchain shell system and ownership verification can include the blockchain shell system orchestrating a cryptographic verification of the NFT ownership. In these embodiments, an owner could transfer an NFT owner identifier, in the form of a public wallet identifier of the NFT, to a verifier, or could alternatively transfer an NFT identifier to the verifier. The verifier could then verify ownership using a process similar to that used in the registration process in FIG. 5. The NFT owner identifier could be a public wallet identifier associated with the NFT on the blockchain. Verifying ownership of the NFT could then include accessing the blockchain and requesting a message to be encrypted with a private key associated with the public wallet identifier.

Figure 6:
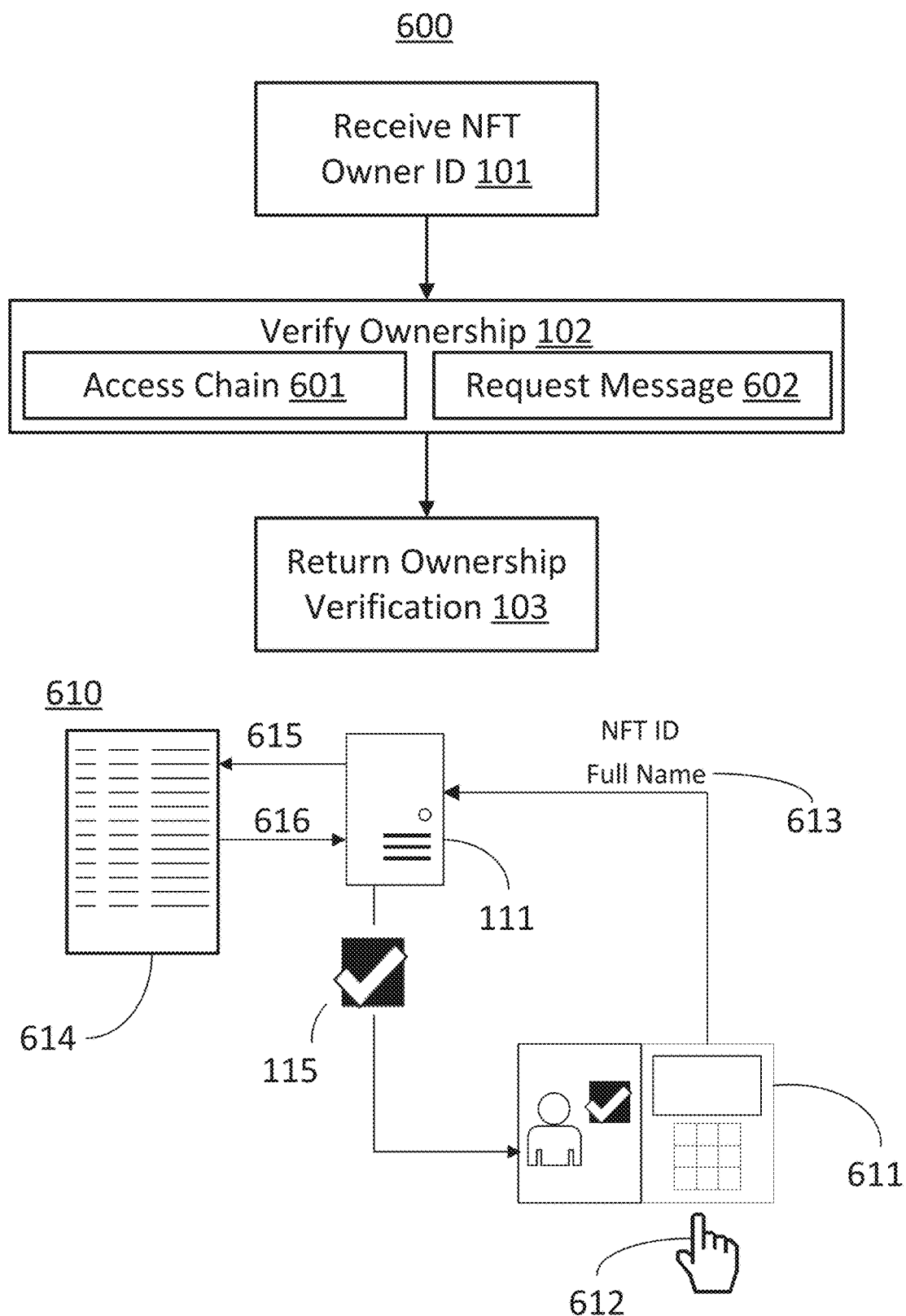
FIG. 6 includes a flow chart for a set of methods and a block diagram of a system for verifying an NFT by verifying ownership using the blockchain associated with the NFT in accordance with specific embodiments of the invention disclosed herein.

FIG. 6 includes a flow chart 600 for a set of methods for verifying ownership of an NFT and a block diagram 610 of a system for conducting those methods. Flow chart 600 includes similar steps to that of flow chart 100 and block diagram 610 includes similar blocks to that of block diagram 110 which use the same reference numbers and are described above. Block diagram 610 differs in that server 111 is illustrated as being able to access blockchain 614. Furthermore, block diagram 610 differs in that the dedicated verifier device 611 includes a keypad instead of an optical scanner for receiving the NFT owner identifier. The identifier can be provided by the owner using any means. In the illustrated case, the identifier is provided by touch input 612 to the keypad. Flow chart 600 differs in that the NFT owner identifier received in step 101 is a personal identification information 613 such as a full legal name of the owner which is provided along with an NFT identification for the NFT. Flow chart 600 also differs in that the verifying ownership step 102 includes a step 601 of accessing the blockchain to obtain a public wallet identifier and a step 602 of requesting a message encrypted with a private key associated with the public wallet identifier. The accessing of the blockchain can be conducted by a server such as server 111 accessing a blockchain such as blockchain 614 using an access request such as access request 615 with the NFT identification as a key with the public wallet identifier or public key of the NFT being provided in a response 616. The server 111 can then administrate the transmission of a request for an encrypted message to the owner of the NFT and can hold for a response. Upon receiving the response and decrypting it using the public wallet identifier or public key, the server 111 can verify ownership of the NFT and return ownership verification data to the dedicated verifier device 611.

Figure 7:
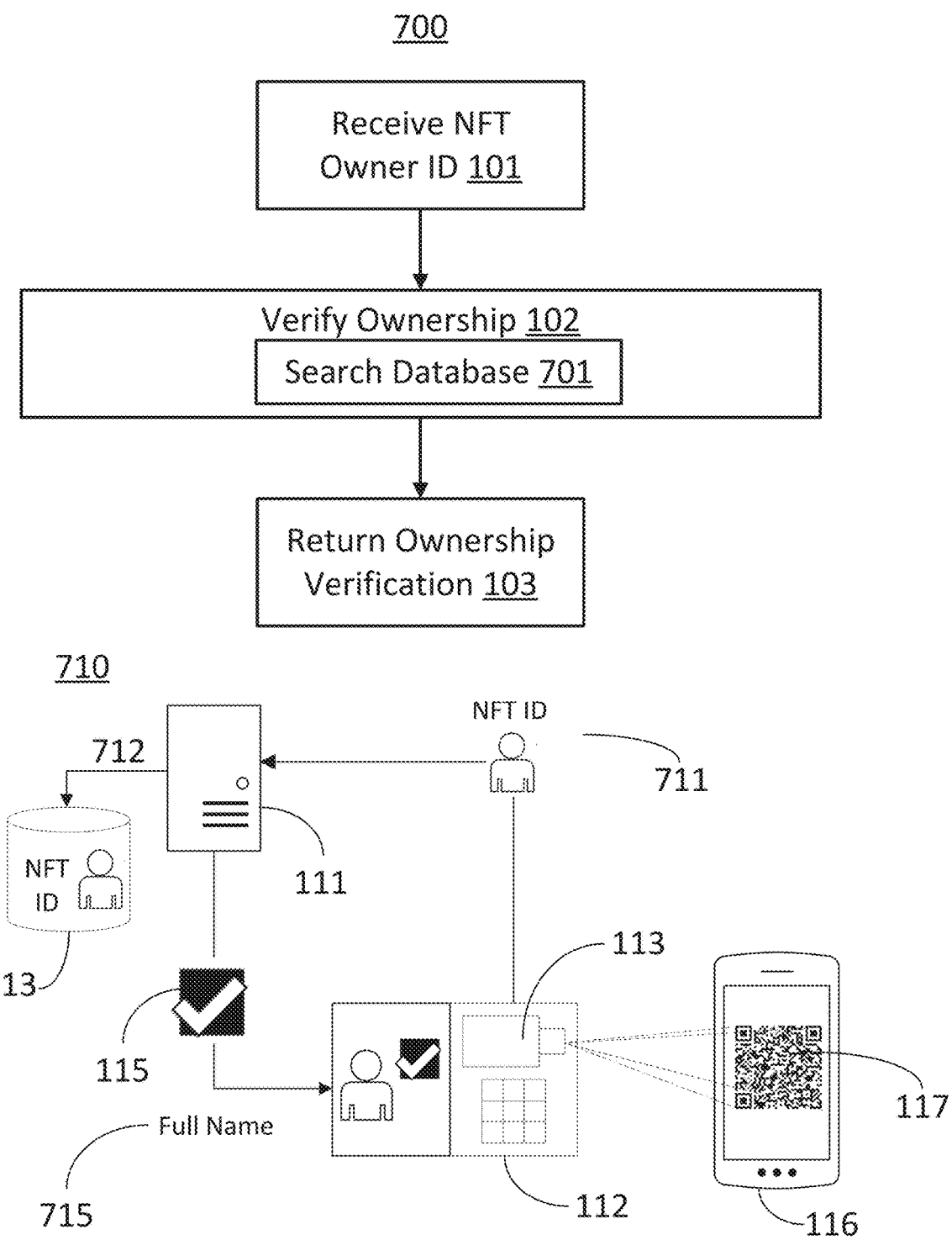
FIG. 7 includes a flow chart for a set of methods and a block diagram of a system for verifying an NFT by searching an internal database of a blockchain shell system in accordance with specific embodiments of the invention disclosed herein.

FIG. 7 includes a flow chart 700 for a set of methods for verifying ownership of an NFT and a block diagram 710 of a system for conducting those methods. Flow chart 700 includes similar steps to that of flow chart 100 and block diagram 710 includes similar blocks to that of block diagram 110 which use the same reference numbers and are described above. Flow chart 700 differs in that the verifying ownership step includes a step 701 of searching a database of the blockchain shell system for the NFT owner identifier. In these embodiments, the blockchain shell system has already registered an NFT such that verification of ownership can be conducted internally. As shown in block diagram 710, upon receiving an NFT owner identifier and an NFT identifier 711, server 111 can run a database access 712 of database 713 using either value as a key and verify that the identified NFT is owned by the identified owner. The ownership verification data that is returned can include a binary indication that ownership was verified or could include additional data such as personal identification information 715 that can be used to allow a verifier to confirm that the person that provided the NFT owner identifier is the true recorded owner of the NFT. In specific embodiments where the NFT owner identifier is a private identifier or where what-you-have security is sufficient, the step of returning the personal identification information does not need to be conducted.

Figure 8:
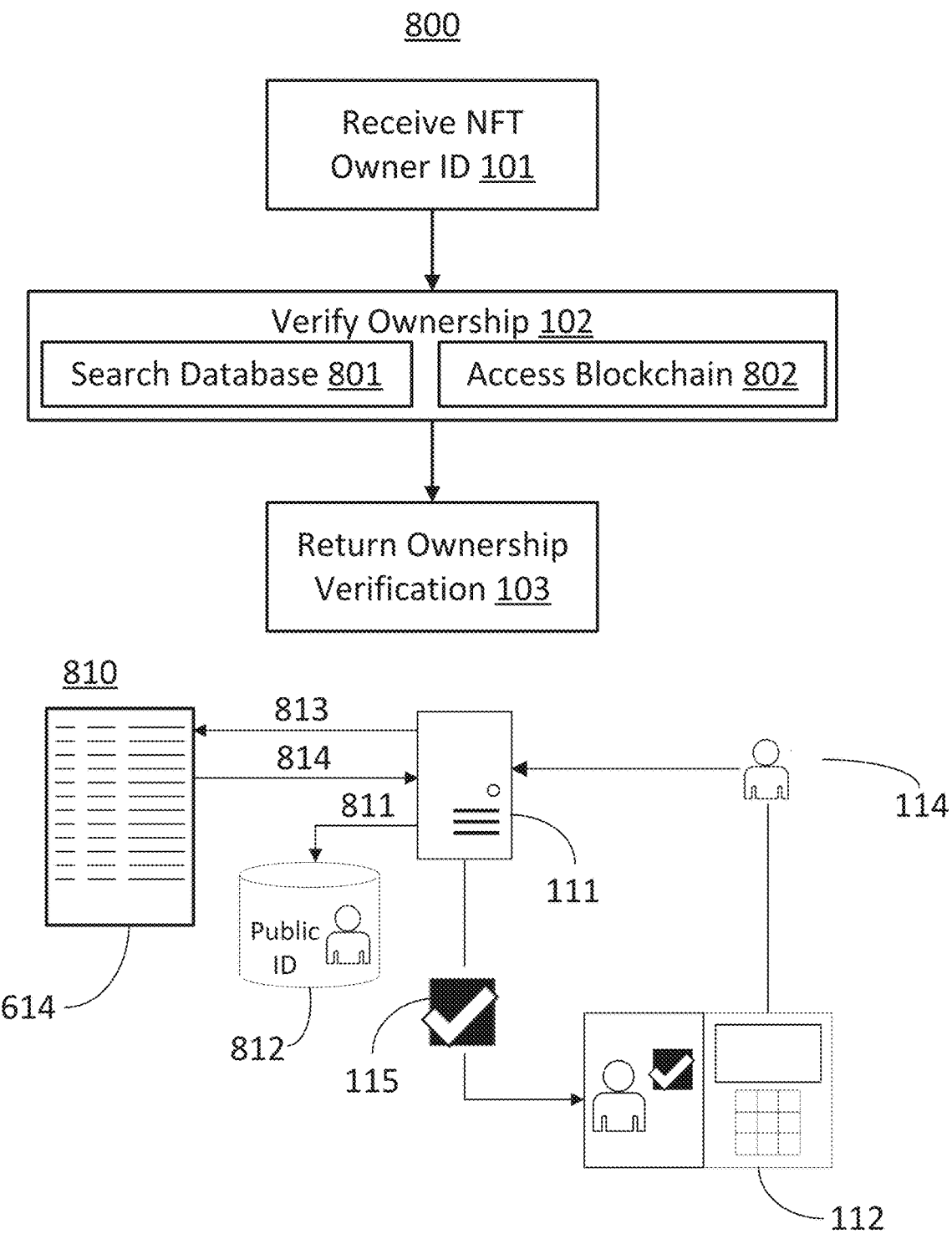
FIG. 8 includes a flow chart for a set of methods and a block diagram of a system for verifying an NFT by searching an internal database of a blockchain shell system and searching for an entry in a blockchain associated with the NFT in accordance with specific embodiments of the invention disclosed herein.

FIG. 8 includes a flow chart 800 for a set of methods for verifying ownership of an NFT and a block diagram 810 of a system for conducting those methods. Flow chart 800 includes similar steps to that of flow chart 100 and block diagram 810 includes similar blocks to that of block diagram 110 which use the same reference numbers and are described above. Flow chart 800 differs in that the verifying ownership step includes a step 801 of searching a database of the blockchain shell system for a public wallet identifier using the NFT owner identifier, and a step 802 of accessing the blockchain to verify that the public wallet identifier is associated with the NFT on the blockchain. As shown in block diagram 810, upon receiving an NFT owner identifier, server 111 can run a database access 811 of database 812 using the NFT owner identifier or an NFT identifier as a key and obtain the public wallet identifier associated with the NFT. Database 812 will include the NFT owner identifier and public wallet identifier (if those values are different) stored in association with an NFT identifier as a registration of ownership of the NFT. Server 111 can then either immediately return ownership verification data 115 to dedicated scanning device 112, or it can double check that the NFT has not been transferred since it was registered with the system. This process can then use the public wallet identifier, NFT address, or NFT identifier to access blockchain 614 with an access request 813 to confirm that the public wallet identifier is still associated with the NFT via a return confirmation 814 that the NFT identifier and public wallet identifier still correspond with the NFT in blockchain 614.

Methods in accordance with specific embodiments of the invention which include a step of receiving an NFT owner identifier from a verifier device can do so in various ways. The step can be conducted by a blockchain shell system receiving the NFT owner identifier through a web connection from a browser or an API connection from a dedicated application. The browser or dedicated application can be on the verifier device. The NFT owner identifier can be transferred from a verifier device, such as a smartphone, to the blockchain shell system. Prior to being transferred to the blockchain shell system, the NFT owner identifier can first be transferred from an owner device to the verifier device, at a locale, using a physical representation of the NFT owner identifier.

The NFT owner identifier can be transferred to the verifier device using various methods and the physical representation can take on various forms. For example, the NFT owner identifier could be a visual encoding in a physical representation in the form of a QR code presented on a piece of paper, or presented on a display of an owner device, which is then scanned by a verifier device with an optical sensor such as a camera. The physical representation could be an electromagnetic encoding such as a short range ultraviolet, infrared, or radio signal (e.g., a short-range wireless connectivity technology such as NFC), an auditory encoding such as a sonic pulse or frequency modulated signal, a visual encoding such as a QR code or bar code, and various other potential physical representations that can be presented by an owner to a verifier at a locale. The verifier device used to receive the NFT owner identifier can be any device with a sensor capable of capturing the encoding of the physical representation such as a camera, infrared scanner, ultraviolet scanner, microphone, or radio receiver. For example, the verifier device could be a smartphone or dedicated scanner. The owner device, if one is used, could be any device capable of providing the physical representation such as a device with a display, an infrared transmitter, a speaker, an RFID tag, a radio transmitter, or any other such device. For example, the owner device could be a smartphone. The physical representation can be stored on and presented by an application on a smartphone of a user. The physical representation can be an encoding of additional information besides the NFT owner identifier such as information that identifies the NFT (e.g., an NFT address on the blockchain or an NFT identifier used internally by the blockchain shell system).

The physical representation can be stored in a digital wallet on an owner device. The physical representation can be part of an electronic identification card stored in the digital wallet in a similar fashion to the way credit cards and boarding passes are currently stored in digital wallets. Those of ordinary skill in the art will appreciate that the term "digital wallet" in this disclosure is being used to refer to wallet applications such as those used for storing everyday payment methods, and the term "wallet" in all other instances is being used to refer to the blockchain construct that includes a public wallet identifier and associated private key.

Figure 9:
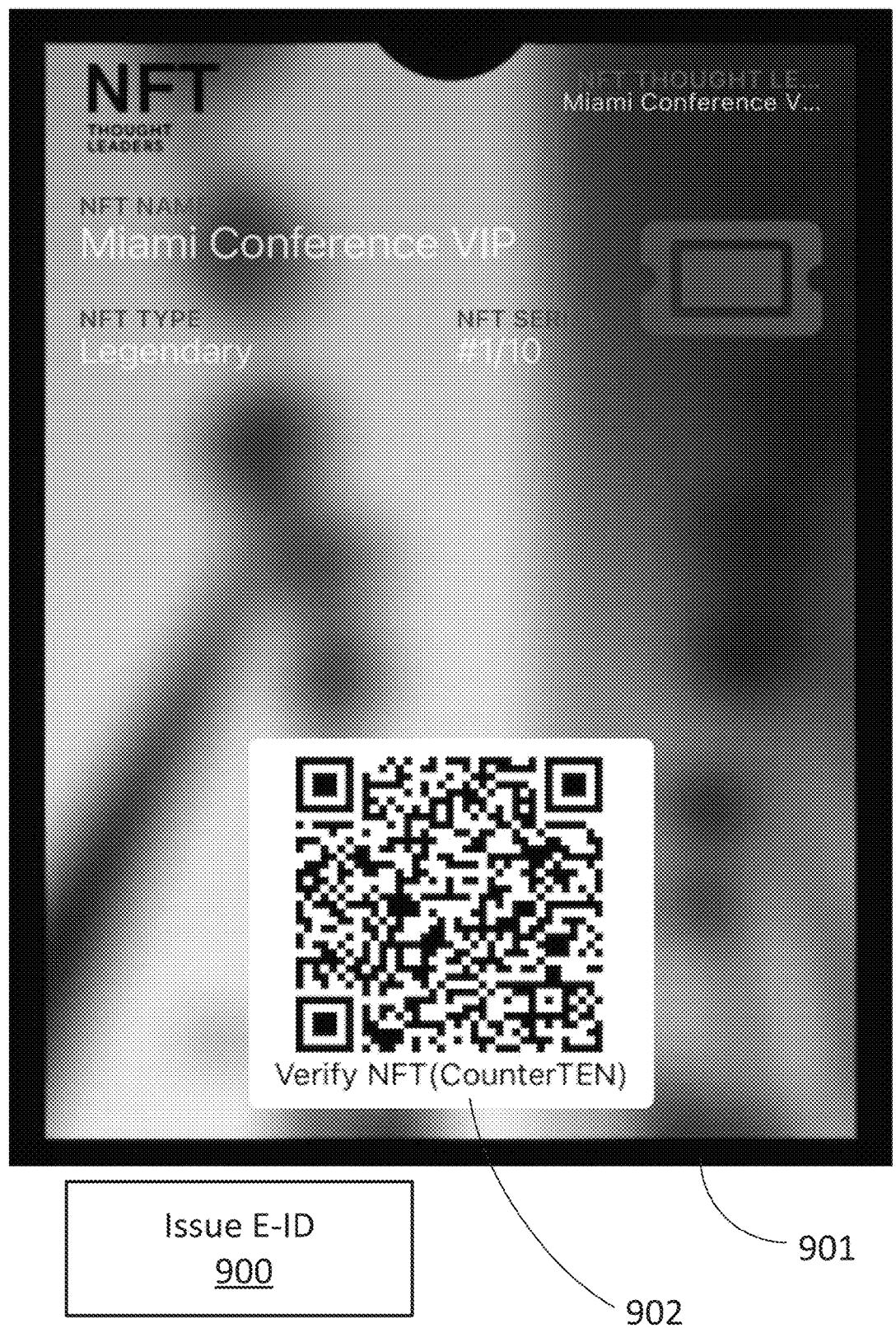
FIG. 9 includes a rendering of an electronic identification card with an NFT owner identifier in the form of a QR code for presentation on an owner device in accordance with specific embodiments of the invention disclosed herein.

An electronic identification card with an NFT owner identifier can be provided to an owner for storage in an electronic wallet in various ways. The electronic identification card can be issued for the NFT owner identifier. This process is illustrated in FIG. 9 which includes a step 900 of issuing an electronic identification card 901 for the NFT owner identifier. The identification card could be stored in a wallet application on an owner device (e.g., an application on smartphone 116) and a physical representation of an NFT owner identifier could be part of the electronic identification card (e.g., QR code 902). For example, the electronic identification card can be issued by the blockchain shell system when the NFT is registered with the NFT shell system. In specific embodiments of the invention, the electronic identification card can be issued to a user in a manner such that it will only function when operating with the digital wallet of the owner of the NFT as registered with the blockchain shell system. In these embodiments, the fact that a user is able to present the NFT ownership identifier alone can be taken as a type of what-you-have security assurance provided on behalf of the blockchain shell system to the verifier. In alternative embodiments, the electronic identification card can be issued by a third party so long as the NFT owner identifier and physical representation are compatible with the blockchain shell system and the verifier device that is used to receive the NFT owner identifier. Such approaches will allow the blockchain shell system to onboard additional NFTs as part of the ownership verification process. In these approaches, a verifier may be provided with a prompt to request contact information from the owner in order to allow the blockchain shell system to contact the owner directly for verification.

The physical representation can include additional information besides the NFT owner identifier. For example, the physical representation can also include an identification of the NFT itself, metadata associated with the NFT, or other information regarding the owner. In this manner, the additional information can be provided from the verifier to the blockchain shell system to allow the blockchain shell system to determine which NFT the verifier would like to verify ownership for. The response from the blockchain shell system to the verifier could then indicate that the NFT was valid and provide an identification of the NFT in addition to ownership verification data. However, this functionality can also be provided by the verifier device itself such that the physical representation does not necessarily need to identify an NFT. For example, if the verifier had a relationship with the blockchain shell system to indicate which NFT ownership would be requested for, then this information would not need to be provided with every ownership verification request. In keeping with this example, a verifier scanning QR codes and using the NFT blockchain shell to verify ownership of NFTs that provide access to a live event could send a request to the blockchain shell to see if the NFT owner identifier was associated with an NFT that provided access to the live event, and the physical representation would not need to encode such information.

In specific embodiments of the invention, as part of the ownership verification processes, owners of NFTs can be incentivized to disclose personal information to a verifier. The personal information can be the information obtained by the blockchain shell system during registration of the NFT as described above. As mentioned previously, an NFT owner can be incentivized during registration to set default sharing parameters for sharing all of a subset of their personal data with verifiers. In accordance with the approaches represented by flow chart 1000 in FIG. 10 and others like them, the incentive can also be provided at the time of ownership verification. For example, a user can be issued an NFT that is registered with the blockchain shell system from a merchant such as by scanning a QR code at a live sporting event. The owner of this newly issued NFT, who is registered with the blockchain shell system, can then proceed to redeem or otherwise verify ownership of the NFT with a verifier. At the time of doing so, the owner could be incentivized to disclose personal information, such as an email address, with the verifier. The incentive could be a discount on products or services offered by the verifier. Alternatively, the owner could have been incentivized while registering with the blockchain shell system originally to share personal information and be rewarded the incentive upon the information being shared with a verifier.

Figure 10:
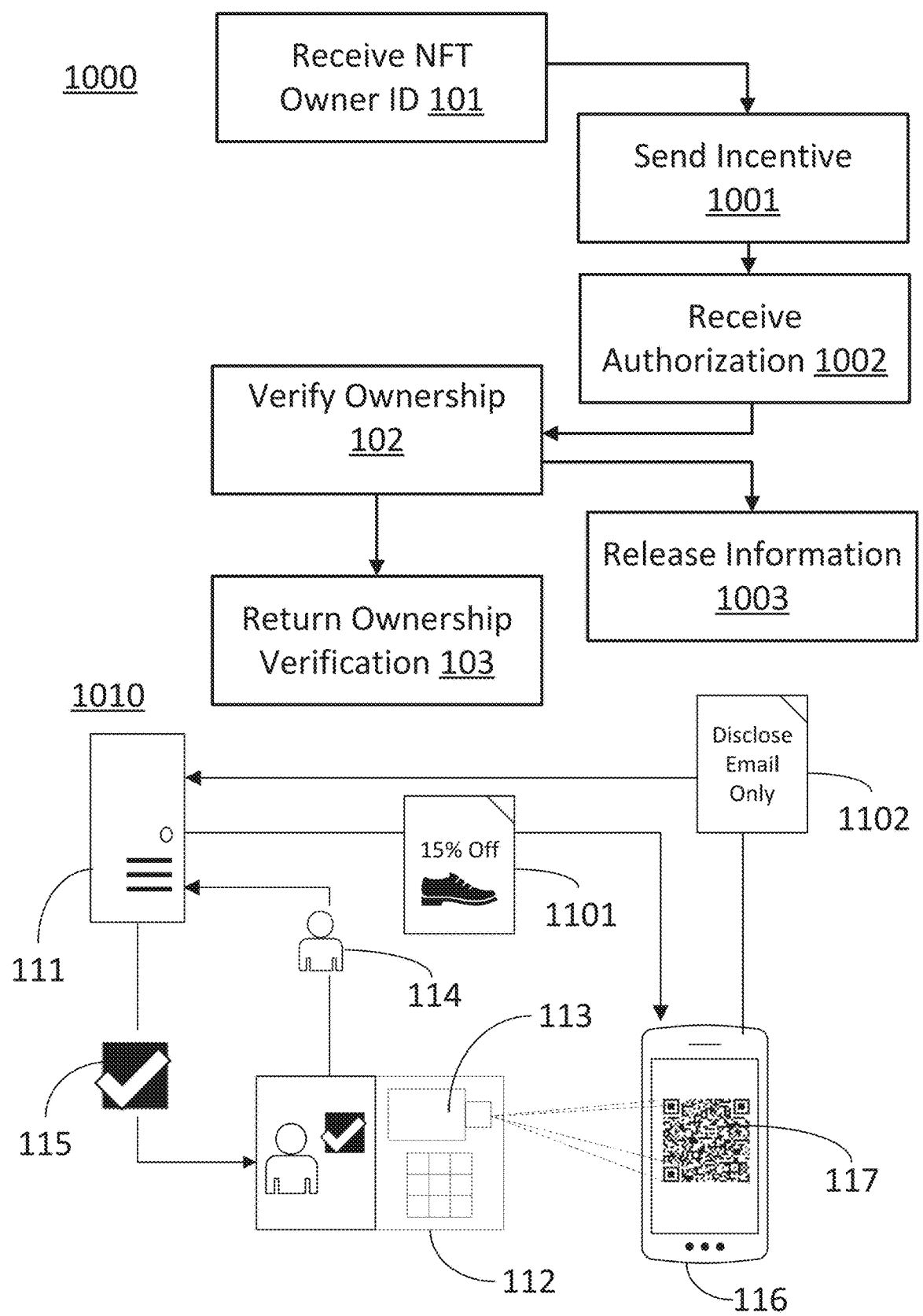
FIG. 10 includes a flow chart for a set of methods and a block diagram of a system for offering an incentive for a personal information disclosure along with verifying an NFT in accordance with specific embodiments of the invention disclosed herein.

FIG. 10 includes a flow chart 1000 for a set of methods for verifying ownership of an NFT while incentivizing the disclosure of personal information to a verifier, and a block diagram 1010 of a system for conducting those methods. Flow chart 1000 includes similar steps to that of flow chart 100 and block diagram 1010 includes similar blocks to that of block diagram 110, which use the same reference numbers and are described above. Flow chart 1000 differs in that the flow chart includes a step 1001 of sending a personal information disclosure incentive for a personal information disclosure authorization to the owner device, a step 1002 of receiving the personal information disclosure authorization from the owner device, and a step 1003 of releasing the personal information after: (i) receiving the personal information disclosure authorization; and (ii) verifying ownership of the NFT using the NFT owner identifier. The incentive can be sent from the blockchain shell system to the owner device using an address of the owner device stored by the blockchain shell system such as an email address or mobile phone number associated with the account. For example, a personal information disclosure incentive 1101 could be sent from server 111 to smartphone 116 for consideration by the owner. The personal information disclosure authorization could be returned from the owner device to the blockchain shell system if the owner feels sufficiently incentivized to disclose the requested personal information. For example, a button for approval could be presented on smartphone 116 along with the incentive and a description of the information requested, and a personal information disclosure authorization 1102 could then be sent from smartphone 116 back to server 111 upon a user clicking the button to provide approval. If the user elected to decline the offer, a different button could be pushed and the incentive would not be rewarded. After the personal information disclosure authorization was received and the ownership of the NFT was verified, the personal information could be released from the blockchain shell system and shared with the verifier.

FIG. 9 is an example of a display on an owner device presenting a physical representation of an NFT owner identifier along with additional information. In the illustrated case, the physical representation is a QR code and the additional information includes metadata from the NFT and accompanying illustrations and other data. As mentioned previously, the accompanying illustrations and other data can be generated by the blockchain shell system when the NFT is registered with the system. The presented images and information could constitute the main content of an electronic identification card stored in a wallet application on the owner device. In a specific implementation, the owner could have searched through an electronic wallet application on their smartphone to find and select the electronic identification card to present the information to a verifier on the display of their smartphone.

As described previously, the step of verifying ownership of an NFT using the owner identifier can be conducted in various ways based on the characteristics of the NFT owner identifier. In an example in accordance with FIG. 9, the physical representation of the NFT owner identifier will be scanned by a verifier with a verifier device having an optical camera which will then transmit the NFT owner identifier to the blockchain shell system. Numerous alternative approaches are possible for how the NFT owner identifier is collected by the verifier device and transferred to the blockchain shell system. The blockchain shell system can then use the NFT owner identifier to verify ownership of an NFT. In specific embodiments, additional information will be transferred from the verifier device to the blockchain shell system such as an identification of the NFT for which ownership verification is being requested.

The blockchain shell system can verify ownership of an NFT in various ways. If the NFT owner identifier is a private identifier issued by the blockchain shell system, verifying ownership may only require checking that the NFT owner identifier is associated with a given NFT before ownership is verified. In these embodiments, the application on the verifier's device used to harvest the private identifier can be designed by the blockchain shell system to assure that the verifier device remains private and encrypted end to end from the owner's device to the blockchain shell system. In these embodiments, the physical representation may be an encrypted encoding of the NFT owner identifier. In alternative approaches, if the NFT owner identifier is a less private string which internally identifies an owner of the NFT in the blockchain shell system, verifying ownership can comprise searching a database of the blockchain shell system for the NFT owner identifier using the NFT owner identifier. In these embodiments, if the NFT owner identifier is in the database, and is associated with a given NFT, then the blockchain shell system can verify ownership without necessarily having to access external sources of information. Alternatively, the blockchain shell system can search the database for the NFT, if it was provided by the verifier device, and determine if the NFT owner identifier stored in association with the NFT matches the NFT owner identifier provided by the verifier device.

In specific embodiments, the process of verifying ownership of the NFT internally to the blockchain shell system can be paired with a double check system in which a public wallet identifier and an NFT address stored by the blockchain shell system are used to access the blockchain to verify that the public wallet identifier is associated with the NFT on the blockchain. Such an approach would assure that the ownership of the NFT had not changed on the blockchain without the blockchain shell being updated. In specific embodiments in which the NFT owner identifier is the public wallet identifier itself, this process could still involve, or could skip, the intermediate step of checking the ownership records on the blockchain shell system and instead jump to checking the blockchain directly.

In specific embodiments, the process of verifying ownership of the NFT can include conducting a cryptographic verification of the ownership. For example, if no internal record was held to verify ownership, the blockchain shell system could access the blockchain and administrate communicating with the owner in order to conduct such an action. If the NFT owner identifier is a public wallet identifier associated with the NFT on the blockchain, or if the public wallet identifier were stored with the NFT owner identifier in the blockchain system, verifying ownership of the NFT could include accessing the blockchain and requesting a message encrypted with a private key associated with the public wallet identifier. Such a process could include contacting the owner through a message sent back to the verifier to request contact information for the owner if the blockchain shell system does not have the owner's contact information.

After verifying ownership of the NFT, the process can continue with returning ownership verification data for the NFT to the verifier device. The ownership verification data can take numerous forms. For example, the ownership verification data could be a flag indicating that the NFT is owned by the person who presented the NFT ownership identifier. In these embodiments, ownership verification could be provided in the form of what-you-have verification because the NFT ownership identifier could only be presented by an electronic wallet, or similar application, on the owner's device as assured by the blockchain shell system. For example, an owner could register their phone with the blockchain shell system by installing an application which was secured by the pin to their phone or a biometric provided to the phone. Being able to present the NFT ownership identifier would then serve as ownership verification of the NFT. Alternatively, or in combination, ownership verification could be provided in the form of what-you-know verification because the NFT ownership identifier is only known to the owner such as the secret key mentioned above. As another example, the ownership verification data could be a full legal name of the user stored with the NFT ownership identifier that is pulled from the blockchain shell system and returned to the verifier. Ownership verification could thereby be provided in the form of who-you-are verification as the verifier could confirm the identity of the person presenting the NFT ownership identifier by checking a government issued ID or some other proof that they were the person having that full legal name. The ownership verification data returned to the verifier device could also include a picture of the owner or some alternative personal data to allow a verifier to confirm ownership. In the case of the ownership verification data being a picture of the owner, the blockchain shell system could validate the picture of the owner while registering the NFT with the blockchain shell system such as by requiring an owner to present a government issued identification card as part of the registration process.

The blockchain shell system can also pull additional information and return it to the verifier device such as the public wallet identifier for the NFT, the NFT address of the NFT on the blockchain, the URL for the publicly available blockchain entry, metadata associated with the NFT, and various other information. The publicly available blockchain entry will generally include the public wallet identifier and metadata for the transaction that created the entry (i.e., the public wallet identifier of the current owner). As such, in specific embodiments, the additional information can allow the verifier to double check that the block chain information matches the information provided by the blockchain shell system. In the case of specific blockchain explorers, a multitude of other data will be included in the publicly available blockchain entry such as a history of past transactions and other associated information.

Figure 11:
FIG. 11 includes a rendering of an ownership verification page with ownership verification data of an NFT for presentation on a verifier device in accordance with specific embodiments of the invention disclosed herein.

FIG. 11 is a rendering of an ownership verification page with ownership verification data of an NFT for presentation on a verifier device in accordance with specific embodiments of the invention disclosed herein. For example, the illustrated page could be displayed on the display of a verifier's smartphone. This particular ownership verification page includes a link 1100 to the NFT on the blockchain which has been sent along with the ownership verification data to allow the verifier to double check the status of the NFT through direct access to a blockchain explorer. The ownership verification data in this implementation has been returned from the blockchain shell system in response to receipt of the NFT ownership identifier from the verifier's smartphone. Accordingly, the page is illustrated with a step 1201 of delivering a link to the NFT on the blockchain with the ownership verification data that can be conducted along with step 103 in specific embodiments in accordance with the flow charts presented herein. In the illustrated case, the ownership verification data includes a name of the owner as registered by the blockchain shell system and presented after the prompt "Owned By." In the illustrated case, additional information was returned such as metadata associated with the NFT (either stored on the blockchain or solely in the blockchain shell system), the public NFT address to allow the verifier to double check the blockchain, and a URL for the publicly available blockchain entry. In situations in which either the NFT ownership identifier is the public wallet identifier for the NFT or the blockchain shell system returns the public wallet identifier to the device along with the ownership verification data, the verifier can use the link to the NFT entry or the NFT address itself to double check that the public wallet identifiers match.

Figure 12:
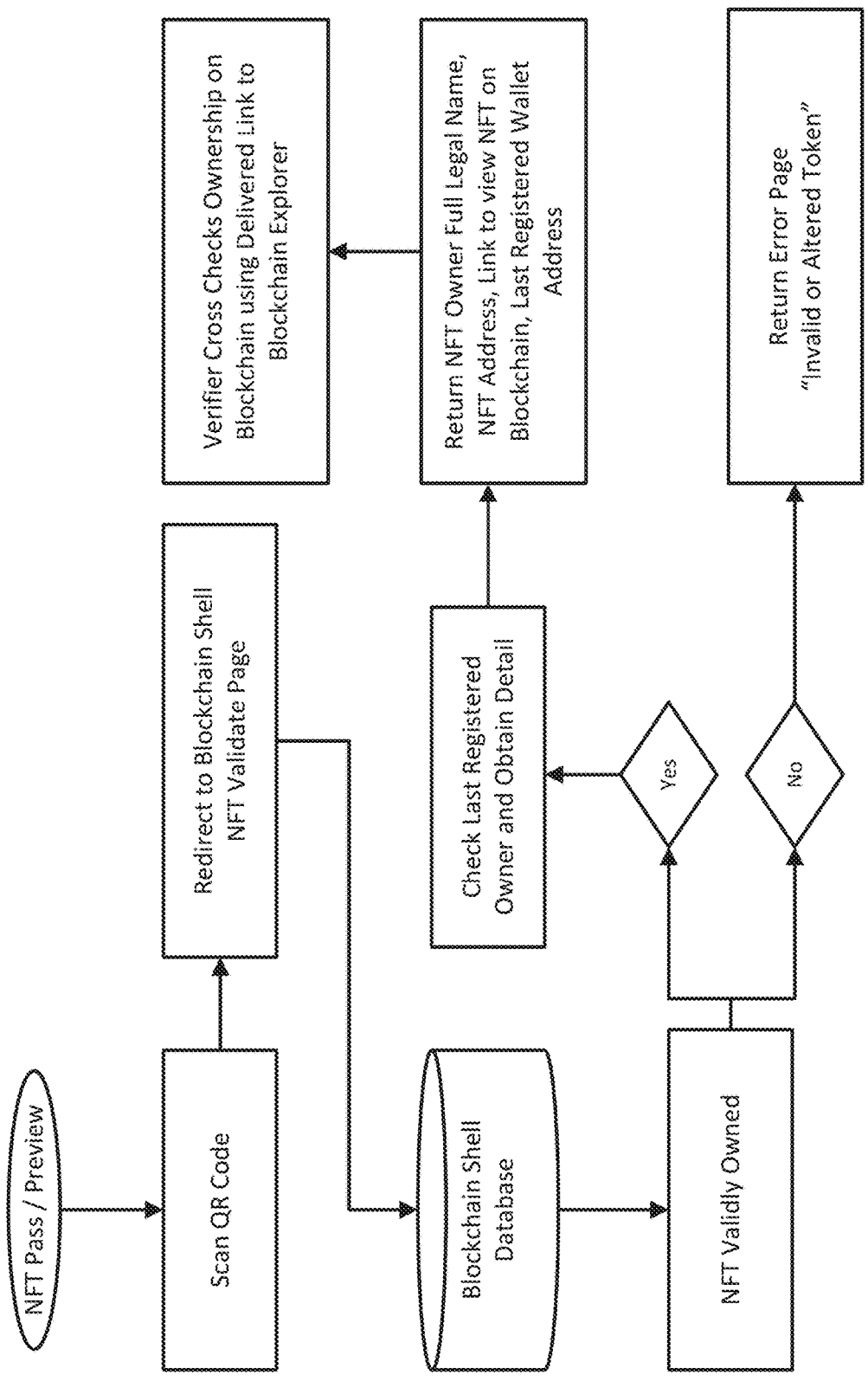
FIG. 12 is a flow chart for a set of methods for verifying ownership of an NFT in accordance with specific embodiments of the invention disclosed herein.

FIG. 12 is a flow chart for a set of methods that illustrate and provide examples for specific embodiments of the invention disclosed above. The flow chart begins with a step of presenting an NFT owner identifier in the form of a QR code, which is followed by the QR code being scanned by a verifier device. This action leads to a redirection to blockchain shell system validate NFT page. The blockchain shell database can then be accessed to see if the NFT is validly held on the system. If the answer is no, the validate NFT page is populated with an "invalid or altered token" message. If the answer is yes, the database is then accessed to find the ownership data for the token to return to the verifier device. In the illustrated case, the ownership data and additional information provided back to the verifier device include the NFT owner's legal name, the NFT address, a link to view the NFT on a blockchain's public explorer system, and the last NFT public wallet identifier stored by the blockchain shell system. In a final step, the user can use the information provided to cross check the last NFT public wallet identifier stored by the blockchain shell system against the NFT public wallet identifier on the blockchain explorer system. In specific embodiments of the invention, any mention of a physical representation in this disclosure could instead refer to a digital representation.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, while the example of an NFT was used throughout this disclosure, some of the approaches disclosed herein are more broadly applicable to the verification of ownership for any kind of token that can be associated with an owner on a blockchain. Furthermore, while the example of the exchange of an NFT ownership identifier exchanged between two users who are present at the same locale and capable of exchanging a physical representation of an NFT ownership identifier was used as an example throughout this disclosure, some of the approaches disclosed herein are more broadly applicable to users that are not in the same locale and that are communicating remotely such as through the Internet or some other means of communication. These and other modifications and variations to the present invention may be practiced by those skilled in the art, without departing from the scope of the present invention, which is more particularly set forth in the appended claims.

What is claimed is:

1. A method for verifying a nonfungible token (NFT) comprising:
   receiving an NFT owner identifier from a verifier device, wherein the NFT owner identifier was transferred from an owner device to the verifier device, at a locale, using a physical representation of the NFT owner identifier;
   verifying ownership of an NFT using the NFT owner identifier;
   returning ownership verification data of the NFT to the verifier device;
   sending a personal information disclosure incentive for a personal information disclosure authorization to the owner device;
   receiving the personal information disclosure authorization from the owner device; and
   releasing personal information after: (i) receiving the personal information disclosure authorization; and (ii) verifying ownership of the NFT using the NFT owner identifier.

2. The method of claim 1, further comprising:
   registering the NFT with a blockchain shell system; and
   wherein registering the NFT with the blockchain shell system includes generating the NFT owner identifier.

3. The method of claim 2, wherein registering the NFT comprises:
   transferring the NFT via an entry on a blockchain.

4. The method of claim 2, wherein registering the NFT comprises:
   accessing a blockchain to find a public key associated with the NFT; and
   requesting a message encrypted with a private key associated with the NFT.

5. The method of claim 1, further comprising:
   registering the NFT with a blockchain shell system; and
   wherein registering the NFT with the blockchain shell system includes generating the NFT owner identifier for storage on an owner device, wherein the NFT owner identifier internally identifies an owner of the owner device in a blockchain shell system.

6. The method of claim 1, further comprising:
   registering the NFT with a blockchain shell system, wherein registering the NFT with the blockchain shell system includes storing a full legal name for an owner in the blockchain shell system;
   wherein the ownership verification data of the NFT includes the full legal name for the owner.

7. The method of claim 1, further comprising:
   the physical representation of the NFT owner identifier is a visual encoding presented on a display of an owner device; and
   the NFT owner identifier is transferred from the owner device to the verifier device using an optical sensor on the verifier device.

8. The method of claim 1, wherein:
   the NFT owner identifier is a public wallet identifier associated with the NFT on a blockchain; and
   verifying ownership of the NFT includes accessing the blockchain and requesting a message encrypted with a private key associated with the public wallet identifier.

9. The method of claim 1, wherein verifying ownership of the NFT using the NFT owner identifier comprises:
   searching a database of a blockchain shell system for the NFT owner identifier using the NFT owner identifier.

10. The method of claim 1, wherein verifying ownership of the NFT using the NFT owner identifier comprises:
    searching a database of a blockchain shell system for a public wallet identifier using the NFT owner identifier; and
    accessing a blockchain to verify that the public wallet identifier is associated with the NFT on the blockchain.

11. The method of claim 1, wherein verifying ownership of the NFT using the NFT owner identifier comprises:
    delivering a link to the NFT on a blockchain with the ownership verification data.

12. The method of claim 1, further comprising:
    issuing an electronic identification card for the NFT owner identifier;
    wherein the electronic identification card is stored in a wallet application on the owner device; and
    wherein the physical representation is part of the electronic identification card.

13. The method of claim 1, further comprising:
    registering the NFT with a blockchain shell system, wherein registering the NFT with the blockchain shell system includes storing the personal information for an owner in the blockchain shell system; and
    wherein registering the NFT with the blockchain shell system includes generating the NFT owner identifier.

14. One or more non-transitory computer-readable media storing instructions that, when executed by one or more processors, cause a system to execute a method for verifying a nonfungible token (NFT) comprising:
    receiving an NFT owner identifier from a verifier device, wherein the NFT owner identifier was transferred from an owner device to the verifier device, at a locale, using a physical representation of the NFT owner identifier;
    verifying ownership of an NFT using the NFT owner identifier;
    returning ownership verification data of the NFT to the verifier device;
    sending a personal information disclosure incentive for a personal information disclosure authorization to the owner device;
    receiving the personal information disclosure authorization from the owner device; and
    releasing personal information after: (i) receiving the personal information disclosure authorization; and (ii) verifying ownership of the NFT using the NFT owner identifier.

15. The one or more non-transitory computer-readable media of claim 14, wherein the method further comprises:
    registering the NFT with a blockchain shell system; and
    wherein registering the NFT with the blockchain shell system includes generating the NFT owner identifier.

16. The one or more non-transitory computer-readable media of claim 14, wherein the method further comprises:
    registering the NFT with a blockchain shell system; and
    generating the NFT owner identifier for storage on an owner device, wherein the NFT owner identifier internally identifies an owner of the owner device in a blockchain shell system.

17. The one or more non-transitory computer-readable media of claim 14, wherein the method further comprises:
    registering the NFT with a blockchain shell system, wherein registering the NFT with the blockchain shell system includes storing personal identifying information for an owner in the blockchain shell system; and
    wherein registering the NFT with the blockchain shell system includes generating the NFT owner identifier.

18. A system for verifying a nonfungible token (NFT) comprising:
- one or more servers configured to receive an NFT owner identifier from a verifier device, wherein the NFT owner identifier was transferred from an owner device to the verifier device, at a locale, using a physical representation of the NFT owner identifier;
- wherein the one or more servers are further configured to verify ownership of an NFT using the NFT owner identifier;
- wherein the one or more servers are further configured to return ownership verification data of the NFT to the verifier device;
- wherein the one or more servers are further configured to send a personal information disclosure incentive for a personal information disclosure authorization to the owner device;
- wherein the one or more servers are further configured to receive the personal information disclosure authorization from the owner device; and
- wherein the one or more servers are further configured to release personal information after: (i) receiving the personal information disclosure authorization; and
- (ii) verifying ownership of the NFT using the NFT owner identifier.

* * * * *